United States Patent

[11] 3,626,041

[72] Inventors Joseph E. Fields;
 Edward H. Mottus, both of Ballwin, Mo.
[21] Appl. No. 775,243
[22] Filed Nov. 13, 1968
[45] Patented Dec. 7, 1971
[73] Assignee Monsanto Company
 St. Louis, Mo.

[54] APPARATUS AND PROCESS FOR MAKING CONTINUOUS FILAMENT
 11 Claims, 1 Drawing Fig.

[52] U.S. Cl. .................................................. 264/24,
 8/2 A, 8/8 E, 51/298, 57/58.89, 57/153, 57/164,
 161/176, 162/3, 162/192, 204/164, 204/180 R,
 204/312, 260/37 R, 260/37 M, 264/108, 264/184,
 264/211
[51] Int. Cl. ........................................................ B29h 1/02,
 B06b 1/02, B01d 13/02
[50] Field of Search........................................... 18/8 E, 24;
 117/17, 93.4, 93.41–93.44; 156/380; 264/24, 26,
 184, 165, 167, 108; 162/3, 192; 204/180, 301,
 299, 165, 312, 164; 260/37 R, 37 M; 51/298;
 161/176; 57/58.84, 153, 164

[56] References Cited
 UNITED STATES PATENTS

| | | | |
|---|---|---|---|
| 1,956,867 | 5/1934 | Land | 264/24 |
| 2,048,651 | 7/1936 | Norton | 264/24 |
| 2,108,361 | 2/1938 | Asakawa | 264/167 |
| 2,158,415 | 5/1939 | Formhols | 264/168 |
| 2,187,306 | 1/1940 | Formhols | 264/24 |
| 2,303,341 | 12/1942 | Dufour et al. | 264/26 |
| 2,390,162 | 12/1945 | Meyer et al. | 264/24 |
| 2,584,441 | 2/1952 | Fredendall | 264/24 |
| 2,826,513 | 3/1958 | Blanchard | 117/93.42 |
| 2,849,312 | 8/1958 | Peterman | 264/24 |
| 2,887,601 | 5/1959 | Bain | 264/108 |
| 2,908,545 | 10/1959 | Teja | 264/24 |
| 3,073,732 | 1/1963 | Hunsdiecker | 264/24 |
| 3,490,115 | 1/1970 | Owens et al. | 264/24 |
| 2,900,320 | 8/1959 | Metcalfe et al. | 204/180 |
| 2,995,503 | 8/1961 | Warner | 204/180 |
| 3,205,160 | 9/1965 | Stengel et al. | 204/180 |
| 3,279,253 | 10/1966 | Blackmon et al. | 204/180 |
| 3,304,251 | 2/1967 | Walker et al. | 204/180 |
| 3,321,391 | 5/1967 | Warfield et al. | 204/165 |
| 3,423,306 | 1/1969 | Hurwitz et al. | 204/299 |
| 3,444,062 | 5/1969 | Felici et al. | 204/301 |
| 3,445,361 | 5/1969 | Srcka et al. | 204/181 |
| 3,489,669 | 1/1970 | Ruhnke | 204/299 |
| 3,497,419 | 2/1970 | Winer et al. | 162/192 |

Primary Examiner—Jay H. Woo
Attorneys—John D. Upham and Joseph D. Kennedy

ABSTRACT: A process for making a continuous filament from discrete particulate matter including particles and fibers and mixtures thereof which may be initially packed and oriented in any random fashion. The particulate matter is added to a reaction vessel having a pair of electrodes therein. A strong electrokinetic field is established in this vessel and this electrokinetic field will untangle and properly orient the various random fibers and particulate matter through its influence. This action will cause close packing of the particulate matter in a desired pattern. Furthermore, the orientation is made to take place in a polymeric composition or resin matrix system so that the particulate matter is not only oriented, but held in the oriented position without the aid of the electrokinetic field. During the process of alignment and polymerization or partial polymerization, the continuous filament is formed and simultaneously removed outwardly from the vessel and then fully cured.

PATENTED DEC 7 1971 3,626,041
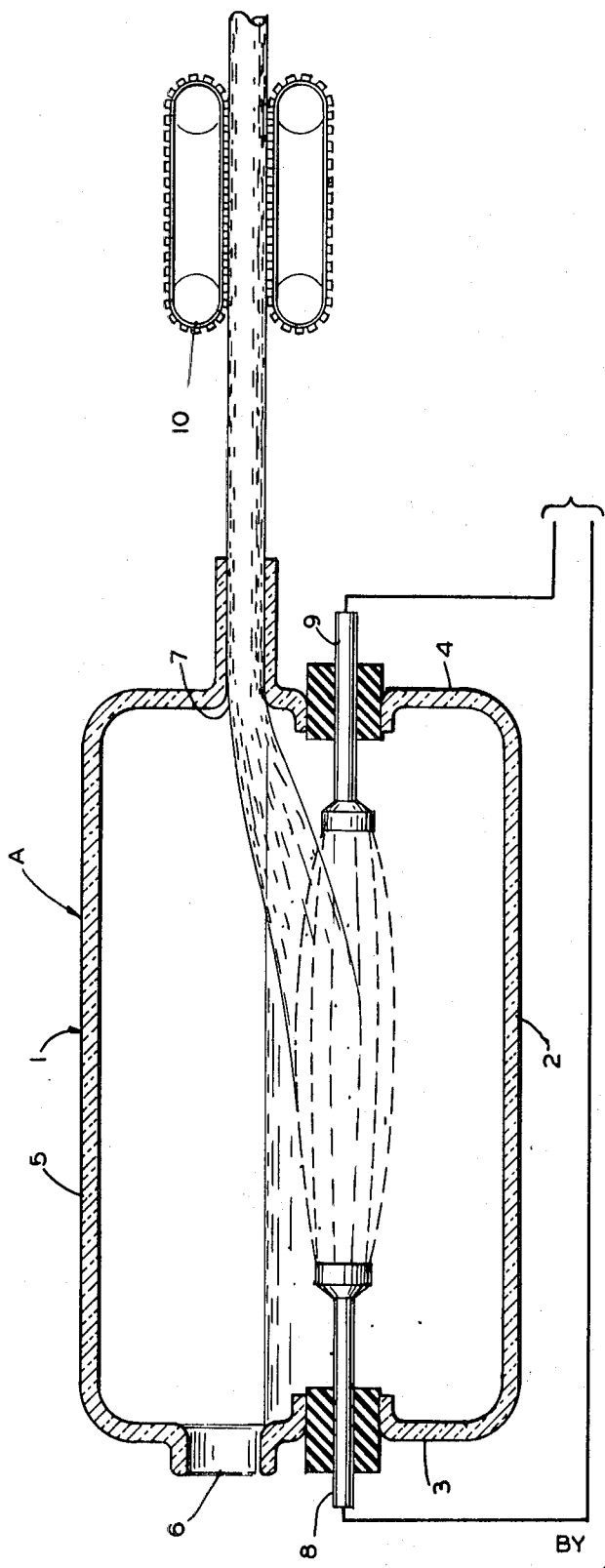
INVENTORS
JOSEPH E. FIELDS
EDWARD H. MOTTUS
BY *Robert J. Schaap*
ATTORNEY

APPARATUS AND PROCESS FOR MAKING CONTINUOUS FILAMENT

This invention relates in general to certain new and useful improvements in an apparatus and process for making a continuous filament, and more particularly, to sn apparatus and process for making continuous filaments by aligning, orienting and packing discrete particulate matter in a desired pattern and encapsulating this particulate matter in a suitable matrix. The encapsulating may be performed by impregnation with low molecular weight precursor which is then polymerized, or with matrix in molten form allowed to solidify.

In recent years, there has been a widespread acceptance and increased use of continuous filaments which are made from monocrystalline whiskers, fibers and other discrete particulate matter. However, for the continuous filament to be produced with the desired internal strength characteristics, it is necessary to properly align substantially all of the particulate matter in a pattern so that each of the particles is oriented along a certain axis. When there is any substantial digression from this desired alignment, the internal strength characteristics of the continuous filament are substantially reduced so that the filament may not serve its intended function.

The present invention is designed to obviate this problem of properly untangling the discrete particulate matter and aligning, orienting and packing the same in a desired pattern so that the continuous filament has the desired internal strength properties. This technique employs electrokinetic effects to achieve these results. The prior art generally limited itself to mechanical or rheological techniques which were not only of limited effectiveness, but also resulted in substantial damage to the individual fibers and particulate matter.

It is, therefore, the primary object of the present invention to provide an apparatus and process for making a continuous filament from discrete particulate matter by untangling the discrete particulate matter, properly aligning, orienting and close packing it in a desired pattern with the aid of electric fields and then encapsulating it in a suitable matrix.

It is another object of the present invention to make a continuous fiber of the type stated by a process which is relatively simple and very inexpensive to perform.

It is a further object of the present invention to provide an apparatus and method of the type stated which enables a polymerization or hardening of the particulate matter in the desired pattern so that the continuous filament retains all of its desired internal strength characteristics.

It is an additional object of the present invention to provide an apparatus and method of the type stated for controlling the reaction temperature employed during the making of the continuous fiber.

In the accompanying drawing:

The figure represents a schematic side elevational view of a reactor which is constructed in accordance with and embodies the present invention and illustrates the method for making the continuous filament.

DEFINITIONS

Inasmuch as the application of electrical phenomena to controllably affect the behavior of particulate matter in a fluid is a relatively new field, it is necessary to establish the following definitions of terms employed herein.

*electrostatic potential*—the potential difference occurring in an electrical field at rest. Electrostatic effects or phenomena are the result of coulombic forces, as opposed to electromotive or electrokinetic forces. These effects are generally dominant in a gaseous medium and can be used to control movement of particulate matter in air as in electrostatic spray painting, fiber flocking, xerography, and electrostatic screen stencil printing.

*electrokinetic potential*—the potential difference occurring in an electrical field as a result of relative movement between a solid and a liquid at the solid/liquid interface, sometimes known as the zeta potential. Electrokinetic effects or phenomena accompanying this relative movement are (1) electro-osmosis, i.e. movement of a liquid along a solid in an electric field; (2) electrophoresis or cataphoreses, i.e. movement of a solid suspended in a liquid in an electric field; (3) streaming potential, i.e. formation of a potential difference between the upstream and the downstream ends of a liquid vein streaming past a solid; and (4) sedimentation potential, i.e. formation of a potential difference between the top and the bottom of a vessel in which a solid powder suspended in a liquid gradually settles to the bottom.

*field of force (force field)*—a field or region of influence of electrical force where electrokinetic potential provides a significant contribution to the total force and oftentimes dominates the total force. While coulombic forces may be present, electrokinetic forces resulting from generation of a zeta potential are appreciable.

*entangelement*—a condition where any fiber or particle in a matrix is not free to move in at least two dimensions. (It is to be noted that a fiber or particle which is freely moveable in only one direction cannot be disentangled from a mass of fibers or particles, such as if the fiber or particle is in the interior of the mass.)

*dispersion*—a suspension of particulate matter in a fluid media in which the fibers or particles are not restricted by other particulate matter, enabling the particulate matter to move in all dimensions.

*orientation*—a condition of three dimensional positioning in prescribed locations in a fluid medium.

*packing*—the degree to which particulate matter fills a volume of space.

*rodlike particulate molter*—defined as "fibers."

*mixing*—the term "mixing" as employed herein is used in its generally established meaning in this particular art, i.e. a uniting or combining into a blend, or agglomerate or amalgamate so as to form a more or less homogeneous whole. This definition does not imply a complete loss of an element's identity and the elements such as fibrous material or particulate matter are distinguishable. The term "mixing" implies a state of commingling.

*aspect ratio*—a comparative term obtained by dividing the nominal length by the nominal diameter (cross section) of particulate matter. (The effectiveness of reinforcement in composite systems is directly dependent on the aspect ratio of the particulate matter used as filler.)

*particulate matter (filler)*—minute parts of a solid of a size sufficient to exhibit the bulk physical and mechanical properties of the solid. "Particles" are defined as particulate matter having an aspect ratio of less than 5. "Fibers" are defined as particulate matter having an aspect ratio of at least 5. (In determining the aspect ratio of particulate matter which have noncircular cross sections, the length of the fiber is compared to an equivalent diameter of a circle which has the same average circumference as the particulate matter.)

*whisker*—a monocrystalline fiber.

*reinforcement*the term "reinforcement" as used herein refers primarily to the enhancement of the properties of an element in the mechanical or structural sense, such as an enhancement of strength, modulus, impact strength, creep.

*coupler*—an agent which will cause the surface of a reinforcing fiber to bond to a matrix such as in the case of amino silanes.

*thermoplastic*—a resinous plastic material which will flow without degradation heat and pressure, such as polystyrene, polypropylene and polycarbonates, etc.

*thermoset*—a resinous or plastic material which will not flow without degradation under conditions of heat and pressure, such as the phenolic, epoxy, polyester, and polyimide resins, etc.

GENERAL DESCRIPTION

Generally speaking, the present invention relates to an apparatus and method which employs electrokinetic phenomena to create a continuous filament. Generally, discrete, particulate matter is introduced into a molten matrix or a polymerizable matrix precursor in the form where the particulate matter may be oriented in any random position and tangled and close packed. A force field is established between two electrodes in the reaction vessel so that the following results are achieved:

1. Untangling of the particulate matter.
2. Dispersion of the particulate matter.
3. Orientation of the particulate matter in a pattern so that the axis of the particulate matter are aligned along a common central axis.
4. A close packing of the fibers in this desired pattern.

DETAILED DESCRIPTION

Referring now in more detail and by reference characters to the drawing which illustrates a preferred embodiment of the present invention. A designates a reaction vessel which can be constructed of any suitable dielectric material such as glass, quartz, fiberglass, some metals or various plastics and synthetic resinous materials. The reaction vessel A or so-called "reactor" generally comprises an outer housing 1 having a bottom wall 2, a left end wall 3, a right end wall 4 and a top wall 5. The left and right end walls 3,4 respectively are apertured somewhere near the upper ends thereof and to accommodate inlet and outlet ports 6,7 respectively. A first electric conductor or electrode 8 is attached to the left end wall 3 and the second electrode 9 is attached to the right end wall 4 in the manner as illustrated in FIG. 1. Each of the electrodes 8,9 are in turn connected to a suitable source of electrical potential (not shown). The reactor A is generally filled at least up to the point of the inlet and outlet ports 6,7 with a suitable liquid matrix and this suitable matrix material may be added through the inlet port 6 or by a standpipe formed in the top wall 5 (not shown). The particulate matter is introduced through the inlet port 6. It should be observed by reference to the figure that each of the electrodes 8,9 are located so they are substantially submerged in the liquid matrix and below the inlet and outlet ports 6,7 respectively.

When the electric field is applied to such a vessel containing a liquid and particulate matter, very apparent and immediate changes are observed. After the application of the electric field across the electrodes, immediate movement of the liquid is noted. Generally, each particle and fiber will begin to become untangled from the mass of particulate matter. Continued application of the electric field creates a condition of wide dispersal of the particulate matter and fibers via electrokinetic effects. This inherently creates a thorough mixing of the fibers with the matrix. In the absence of any physical implement creating the mixing conditions, there is no appreciable damage to any of the fibrous material which normally may be subject to damage upon even slight contact with a physical element. By adjusting the electrodes in a manner to be subsequently described in detail, it is possible to obtain any desired orientation of the fibrous material and particulate matter in the liquid medium. The force fields and the method and apparatus for achieving these unique effects on particulate matter in a liquid medium is more fully defined as described in copending application Ser. No. 775,242, filed Nov. 13, 1968.

After the particulate matter has been oriented, the matter will become closely packed and properly aligned. The field of force applied to this mixture will hold the filler material in its desired position. Furthermore, where the medium is a polymer precursor (monomer), a partial polymerization can be caused to occur inside of the reactor 1. At this time, the force field may be released and the polymer composite may be finally cured. Naturally, a prepolymer system may be used in the reaction vessel 1. The term "prepolymer system," as used herein, includes either monomers or prepolymers together with the appropriate catalysts, initiators, inhibitors, regulators, curing agents, etc. The process of the present invention additionally comprises the mixing of the filler with an inviscid melt of a polymer and applying the force field to the resultant slurry to orient the filler and cooling the slurry of oriented filler to a temperature sufficient to hold the filler in the oriented position without the aid of the force field. After this time, the force field may be released and the polymer cooled further.

The positioning of the force field is dictated by the desired shape and form of the continuous filament which is to be made. Since the greatest reinforcement of the filled polymeric compositions is achieved in the directions parallel to the orientation of the filler, the electrodes are opposed with respect to each other to provide a force field with substantially parallel lines of force.

The strength of the force field required depends upon such factors as the extent of orientation desired, the quantity, size and shape of filler incorporated into the prepolymer or polymer system, the viscosity of the prepolymeric or polymeric medium, and heat generated in the polymer system by application of the force field. Examples set forth herein describe some suitable force fields useful in the practice of this invention. Those skilled in the art, guided by the properties they desire in finished articles in conjunction with this disclose will be able to use stronger or weaker force fields with equal, or nearly equal, success.

Some of the filler materials which may be employed in the present invention are particulate matter which may be formed of either dielectric or electrically conductive materials. However, with electrically conductive fillers, the electrode should be shielded. Some of the important prerequisites for good alignment and close packing in the strong field regions of the system are: (1) the dielectric constant of the suspended fibers must be significantly greater than that of the liquid, (2) the applied electric field must be intense enough to cause adequate agitation, initially to disperse the particulate matter and yet (3) not so intense to cause vigorous electrokinetic flow of liquid matrix in latter stages of polymerization or solidification. The filler material should preferably have a dielectric constant at least 1.5 times higher than the dielectric constant of the liquid. The fibers which are used should have a minimum length of 0.25 inch.

For a particular system, the particulate matter may be quartz and other forms of silica such as dehydrated silica sol, fume silica, silica gel, glass fibers, cristobalite, etc., mineral silicates such as wollastonite, spodumene, mica, mullite, sillimanite; asbestos such as chrysolite and crocidolite, forsterite and hercynite; clays such as kaolinite, dickite, nacrite, beidellite, bentonite, hectorite, montmorillonite, nontronite, saponite, and attapulgite; metals such as iron, cobalt, nickel, aluminum, tin, lead, magnesium, calcium, strontium, barium, titanium, zirconium, vanadium, chromium, manganese, copper and zinc; the corresponding oxides of the above metals; and other inorganic materials such as heavy metal phosphates, sulfides, and sulfates.

The filler may be particles, polycrystalline fibers or monocrystalline fibers such as whiskers. However, much greater improvements are possible with fibrous filler in structural properties such as compressive, tensile, flexure and shear strengths and moduli than with granular material. Fibrous reinforcement also provides greater improvement in dynamic mechanical properties, particularly impact resistance, toughness and creep, than does granular material. Filler systems can, therefore, be formulated to maximize the features desired for a particular continuous filament.

Attachment or coupling of the filler to the cured polymer can be achieved by mere mechanical bonding due to physical forces or it can be chemically bonded to the polymer by the inclusion of a coupling agent in the prepolymer system which reacts with both filler and polymer to produce a chemical bond therebetween.

A prepolymer system can contain a quantity of orientable reinforcing agent in combination with a quantity of unorientable filler. Optimum ratios of polymer to unoriented filler to oriented reinforcing agent can provide castable or moldable compositions of very high strength, modulus, and impact resistance.

The quantity of filler which can be employed depends on several considerations such as the processability of the composite mix or fabricability of the final composite, the shape, or matrix system being utilized, the particle size and shape, the design of the mold, the type and strength of the force field, the specific gravity of the filler, and most importantly, the degree of reinforcement desired. Depending upon these and other factors, the filler may comprise from about 5 percent to about 95 percent by weight of the finished composition. A preferred range useful in achieving appreciable reinforcement by the practice of this method is from about 40 percent to about 90 percent by weight of the total composition. If reinforcement of the polymer is not one of the objectives of the filler orientation, a lower range of filler concentration from about 5 percent to about 50 percent by weight may be preferred.

Polymers useful in the present invention include those synthetic and natural resinous materials which are or can become sufficiently fluid when heated to permit movement of filler particles into an oriented position upon application of a force field to the filler-polymer mixture. Also included are monomers or prepolymers of synthetic thermoplastic and thermosetting resins having a fluid viscosity in the range which permits movement of filler particles into an oriented position upon application of a force field to the filler-monomer or prepolymer mixture. Particularly preferred polymers are those which possess relatively high flexural and tensile strengths and moduli without reinforcement. Examples of such polymers include thermosetting resins such as the polyesters, polyimides, phenol-formaldehydes, and epoxies, and thermoplastic resins such as the vinyl polymers and copolymers, the polycarbonates and others. Other resin systems, however, normally employed in applications where properties other than strength and rigidity are required, can find increased and expanded utility when filled or reinforced according to this invention. Examples of such polymers include the polyolefins, polyvinyl chloride, and polyurethanes.

After the particulate matter has been oriented and packed in the force field, the matrix can then be polymerized in any conventional fashion. For example, if the matrix is a thermosetting material mixed with a curing agent, the application of heat to a catalyzed system will cause a hardening of the matrix. The polymerization mechanisms employed in this invention are conventional and are, therefore, neither illustrated nor described in detail herein. However, it is also possible to accelerate the polymerization reactions by the method and apparatus described in copending application Ser. No. 775,236, filed Nov. 13, 1968. This latter technique of polymerization forms another inventive concept and is, therefore, neither illustrated nor described herein.

The electrodes must be constructed of an electrically conductive material such as copper or stainless steel. However, the specific material employed will be determined by the system. The electrodes may be in direct contact with liquid, or as a modification thereof, both of the electrode surfaces may be insulated by air, a vacuum or a solid dielectric from the liquid media. Voltage requirements will be increased, however, if the electrodes are insulated from the liquid.

The theory of operation of these phenomena resulting from the employment of the force fields, though not completely understood, is more fully described in the aforementioned copending application Ser. No. 775,242, filed Nov. 13, 1968.

As indicated previously, the size and shape of the electrodes are dictated by the desired characteristics of the final continuous filament. However, as also indicated, it is desirable to have each discrete particle oriented in a pattern where all of the particles are substantially parallel to the principle axis of the filament. By reference to the FIGURE it can be seen that the fibers are generally axially aligned or perpendicular to the flat surfaces of the electrodes 8,9 when located in the force field.

The fields of force which occur when a potential is created across the electrodes are illustrated by the solid lines. Initial fiber flow would occur substantially as indicated by the dotted lines. The fibers become oriented along the lines of force and the liquid flow does somewhat conform to these lines of force.

Actually, a "bulk" situation exists where particles are pulled or urged from the bulk to the lines of the strongest field, namely, the lines of force existing directly between two electrodes. Naturally, if it is attempted to orient a bulk system with a high volume loading a relatively strong force field is needed to overcome the frictional effects of the particulate matter in the packing.

A neutral fiber will react differently than a fiber which maintains a charge in the field. A neutral fiber generally is one that maintains no electrokinetic charge. However, in the terms of the present invention, a fiber in a matrix which is neutral is considered to be a "neutral fiber" when it maintains no electrostatic charge and has no zeta potential. A true neutral fiber is one that will orient itself in the direction of the field but which is not subject to electrophoresis which would cause it to migrate to one of the electrodes. However, it should be recognized that the neutrality of the fibers will change in different systems. In the case of the neutral fiber and a lack of electrophoresis effects, the fibers will tend to orient themselves along the lines of the field in a closely packed arrangement between the two electrodes. This occurs as a result of the lowering of the free energy of the system.

It has been found in connection with the present invention that the energy requirements for such movement, that is movement of particulate matter through the liquid, often are about the same, or perhaps less than would be experienced with a similar level of conventional mechanical agitation. However, any fiber breakage is substantially reduced and almost completely avoided by means of electrokinetic agitation where the individual particles and fibers experience gentle, nonmechanical forces and the secondary mechanical forces arising from the flow and particle interactions are not severe.

As the continuous filament is formed in the reaction 1, it is pulled outwardly through the outlet port 7 by means of a conventional takeup device 10. It is to be noted that the force field is sufficient to not only properly align but to hold the fibers in the aligned position and also in the closely packed arrangement. This force is sufficient until the final composite is finally cured.

It is desirable to employ a pair of drafting rollers (not shown) interposed between the outlet port 7 and the pulling unit 10 for providing a slight twist to the composite filament as it is removed from the vessel 1. This slight twist will provide some internal strength to the composite before it is completely hardened. The drafting rollers are conveniently located at an oblique angle in order to provide this twist. In addition, it is preferable to continually add filler and liquid materials to the reaction vessel 1 during the process of preparing the continuous filament. The filler may be added independently of or simultaneously with liquid materials in the desired proportions, which in turn depends on the rate of removal from the reaction vessel. In some cases, it may be feasible to add these components through a standpipe on the tubing wall of the housing. However, depending upon the quantities added and the rate of addition, the turbulent effects may interfere with the process of forming the continuous filament. In this event, a pipe could be connected to the lower end of the housing for adding this additional material. The necessary baffles could also be employed in order to minimize the effects of turbulence.

EXAMPLES

The invention is further illustrated by, but not limited to, the following examples. The following two examples disclose the production of continuous strands of unidirectionally oriented and slightly twisted inorganic fibers useful as reinforcing agents in high performance structural composites. The following examples disclose the production of these strands of fiber in a simple laboratory reactor prepared with both thermoplastic and thermosetting matrix systems. In these examples, the fiber strands are carried from the reactor by fluid flow, but it should be understood that other techniques such as "vortex" twisting of the strands could be used to remove the strands from the reactor system and the same to the takeup mechanism.

EXAMPLE 1

The reactor for this example consists of a conventional 50 ml. Pyrex volumetrix flask (having a bulb approximately 3 inches in diameter fixed with a 4.5 inch neck three-eighths inch in inner diameter). The reactor is modified by adding a hypodermic inlet port one-eighth inch I.D.) in the bottom and placing a copper disk electrode (one-half inch dia.) one-half inch below and centered in the neck opening and a copper hemispherical electrode one-quarter inch dia.) in the neck 3 inches above the disk electrode. The flask neck is reduced to one-eighth inch diameter above the upper electrode and lengthened to 2 inches. The neck is fitted with a jacket suitable for passing steam or cooling water uniformly around the enclosed area from 2 inches below the upper electrode to 1 inch above the upper electrode.

A suspension of 5 percent refractory fibers (99.2 percent silica, HITCO) one-half inch in length are prepared using low viscosity (melt index) molten polyethylene and are introduced into a suspending medium in the reaction system to form a slurry. This solution or slurry is then pumped into the reactor through the inlet port at a controlled rate. After the liquid level has reached the upper electrode, a 21,000-volt DC current is applied across the electrodes of the reactor. The introduction rate of the slurry into the reactor is 5 cubic centimeters per minute, capable of yielding approximately 12 centimeters of strand per minute.

After the application of the electric field, the fibers in the vicinity and above the bottom electrode become untangled and become aligned perpendicularly to the electrodes. Furthermore, the fibers will migrate and pack toward the center of the tube neck so that a resin rich lubricating layer may be formed around the outside of the tube. In addition, fiber orientation becomes less perfect, with a tendency to "fan out", around the upper electrode due to the hemispherical geometry, thus facilitating flow of the suspension and maintenance of the fiber orientation around the upper electrode.

At this point the temperature of the suspension in the electrode region is controlled so that the suspending medium becomes viscous enough to "lock" fibers in position. In the case of thermoplastics, this is achieved by passing cooling water through the neck jacket; mixtures of thermosets with curing agents, on the other hand, are partially cured by heating the jacket area with steam. As pumping of the suspension through the inlet port continues, the partially cured strand of oriented fibers is forced around the upper electrode and into the restricted region of the neck. Shear forces resulting from restriction of the suspension tend to restore any fiber orientation lost in passing of the suspension around the upper electrode and results in a strand of highly unidirectional, overlapped fibers. The resin rich region around the strand tends to lubricate the strand and facilitate smooth movement up and out of the tube where twisting and strand takeup occur (by conventional drafting and windup equipment).

Examination of the strand produced shows the fibers are well oriented and overlapped. The strands are glossy in appearance and on sectioning are shown to have a distinct coresheath structure. The polyethylene forms a sheath in the region of some of the fibers, particularly the core of fibers with the highest concentration near the center. The strands are layed side-by-side and pressure molded to give sheaths of unidirectionally oriented fiber and the sheaths are used to form laminates.

EXAMPLE 2

The apparatus employed for example 1 is also used for example 2 and the conditions of operation are substantially similar. However, where a thermoplastic resin was used in example 1, a thermosetting resin is used in this example.

A suspension of 17.5 percent D.S. -grade silicon carbide whiskers (Carborundum Company) was prepared using a mixture of Epon 828 epoxy resin (Shell Chemical Company) and a tetraethylenetetramine curing agent is passed through the reactor.

When a 23,000-volt DC current is applied across the electrodes, vigorous agitation is noted in the region of the lower electrode with definite stream line developing between the electrodes parallel to the tube axis. By the time the suspension reaches the upper electrode the whiskers migrate to the center of the tube sufficiently so that a region of clear resin around the tube walls can be seen. The stream lines disappear as primarily suspension passes the upper electrode but the region of clear resin tends to persist. With an electro-osmotic rate of 5 cc. suspension per minute and a steam jacket temperature of 130° C., approximately 12 cm. of tacky strand are obtained per minute. The strand is taken up on a rotating, "square" drum as a collimated sheet and cured in an oven to the point that it is nontacky. Flat sheets cut from the drum are used to prepare crossplied laminates.

It should be understood that changes and modifications can be made in the form, construction, arrangement, and combination of parts presently described and pointed out without departing from the nature and principle of our invention.

Having thus described our invention, what we desire to claim and secure by Letters Patent is:

1. A process for producing a continuous strand of filament, said process comprising introducing discrete fibers having an aspect ratio of at least 5.0 into [a] an electrically nonconductive liquid matrix and where the fibers have a dielectric constant at least 1.5 times greater than the dielectric constant of the liquid matrix, applying an electric field through said matrix under conditions giving rise to electrokinetic effects which are primarily dominated by electrophoretic effects enabling movement of the fibers with respect to the liquid matrix and electro-osmatic effects enabling movement of the liquid matrix with respect to the fiber, said field being of such magnitude so that the electrokinetic effects dominate other forces acting on individual fibers and at a strength at least sufficient to cause an untangling and dispersion of the fibers and thereafter cause proper orientation and close packing of the fibers in the liquid matrix to form a continuous filament, partially solidifying the liquid matrix surrounding the fibers to maintain a cohesive force between the fibers and partially solidified liquid matrix and thereby maintain the fibers in close packed alignment in the matrix surrounding said fibers and removing said filament from the unsolidified liquid matrix as it is thus formed.

2. The process of claim 1 wherein substantially all of said fibers have their major axis substantially aligned.

3. The process of claim 1 wherein said fibers are rod-shaped.

4. A process for producing a continuous strand of filament, said process comprising introducing discrete fibers having an aspect ratio of at least 5.0 into [a] an electrically nonconductive liquid matrix and where the fibers have a dielectric constant at least 1.5 times greater than the dielectric constant of the liquid matrix, applying an electric field through said matrix under conditions giving rise to electrokinetic effects which are primarily dominated by electrophoretic effects enabling movement of the fibers with respect to the liquid matrix and electro-osmotic effects enabling movement of the liquid matrix with respect to the fiber, said field being of such magnitude so that the electrokinetic effects dominate other forces acting on individual fibers and at a strength at least sufficient to cause untangling of the fibers, dispersion of the fibers, orientation of the fibers, and close packing of the fibers in the desired orientation where substantially all of said fibers have their major axis substantially aligned, to form a continuous strand of filament, partially solidifying the liquid matrix surrounding the fibers to maintain a cohesive force between the fibers and partially solidified liquid matrix and thereby maintain the fibers in close packed alignment in the matrix surrounding said fibers and continually removing the continuous strand of filament from the unsolidified liquid matrix.

5. The process of claim 4 further characterized in that the liquid matrix contains a nonconductive prepolymer system which prepolymer system is capable of being actuated by an electric field, and that at least sufficient polymerization occurs in the liquid matrix to independently hold the fiber in an oriented position before releasing the electric field.

6. The process of claim 4 further characterized in that said electric field comprises an electrical potential difference where an electrical potential provides a significant contribution to the total force of the electric field.

7. A system for producing a continuous strand of filaments, said system comprising a reactor vessel, means for introducing discrete fibers having an aspect ratio of at least 5.0 into [a] an electrically nonconductive liquid matrix and where the fibers have a dielectric constant at least 1.5 times greater than the dielectric constant of the liquid matrix, means associated with said reactor vessel for applying an electric field through said matrix under conditions giving rise to electrokinetic effects which are primarily dominated by electrophoretic effects enabling movement of the fibers with respect to the liquid matrix and electro-osmotic effects enabling movement of the liquid matrix with respect to the fiber, said field being of such magnitude so that the electrokinetic effects dominate other forces acting on individual fibers and at a strength at least sufficient to cause proper orientation and close packing of the fibers in the liquid matrix to form a continuous strand of filaments, partially solidifying the liquid matrix surrounding the fibers to maintain a cohesive force between the fibers and partially solidified liquid matrix and thereby maintain the fibers in close packed alignment in the matrix surrounding said fibers and means for removing said strand of filaments from the unsolidified liquid matrix as it is formed.

8. A process for producing a continuous strand of filament, said process comprising introducing discrete fibers having an aspect ratio of at least 5.0 into a [a] an electrically nonconductive liquid matrix and where the fibers have a dielectric constant at least 1.5 times greater than the dielectric constant of the liquid matrix, said filaments being selected from the class consisting of fibers of silica, silica sol, fume silica, silica gel, glass fibers cristobalite, wollastonite, spodumene, mica mullite, sillimanite, chrysolite crocidolite, forsterite, hercynite, kaolinite, dickite, nacrite, beidellite, bentonite, hectorite, montmorillonite, montronite, saponite, attapulgite, iron, cobalt, nickel, aluminum, tin, lead, magnesium, calcium, strontium, barium, titanium, zirconium, vanadium, chromium, manganese, copper, zinc, the corresponding oxides of the above said metals, and heavy metal phosphates, sulfides, and sulfates, said matrix being selected from the class consisting of polyesters, polyimides, phenol-formaldehydes, epoxies, vinyl polymers and copolymers polycarbonates, polyolefins, polyvinyl chloride, and polyurethanes, applying an electric field through said matrix under conditions giving rise to electrokinetic effects which are primarily dominated by electrophoretic effects enabling movement of the fibers with respect to the liquid matrix and electro-osmotic effects enabling movement of the liquid matrix with respect to the fiber, said field being of such magnitude so that the electrokinetic effects dominate other forces acting on individual fibers and at a strength at least sufficient to cause proper orientation and close packing of the fibers in the liquid matrix to form a continuous filament, partially solidifying the liquid matrix surrounding the fibers to maintain a cohesive force between the fibers and partially solidified liquid matrix and thereby maintain the fibers in close packed alignment in the matrix surrounding said fibers and removing said filament from the liquid matrix as it is thus formed.

9. The process of claim 8 wherein substantially of of said fibers have their major axis substantially aligned.

10. A process for producing a continuous strand of filament, said process comprising introducing discrete fibers having an aspect ratio of at least 5.0 into [a] an electrically nonconductive liquid matrix and where the fibers have a dielectric constant at least 1.5 times greater than the dielectric constant of the liquid matrix, said filaments being selected from the class consisting of fibers of silica, silica sol, fume silica, silica gel, glass fibers, cristobalite, wollastonite, spodumene, mica, mullite, sillimanite, chrysolite crocidolite, forsterite, hercynite, kaolinite, dickite, nacrite, beidellite, bentonite, hectorite, montmorillonite, nontronite, saponite, attapulgite, iron, cobalt, nickel, aluminum, tin, lead magnesium, calcium, strontium, barium, titanium, zirconium, vanadium, chromium, manganese, copper, zinc, the corresponding oxides of the above said metals, and heavy metal phosphates, sulfides, and sulfates, said matrix being selected from the class consisting of polyesters, polyimides, phenol-formaldehydes, epoxies, vinyl polymers and copolymers, polycarbonates, polyolefins, polyvinyl chloride, and polyurethanes, applying an electric field through said matrix under conditions giving rise to electrokinetic effects which are primarily dominated by electrophoretic effects enabling movement of the fibers with respect to the liquid matrix and electro-osmotic effects enabling movement of the liquid matrix with respect to the fiber, said field being of such magnitude so that the electrokinetic effects dominate other forces acting on individual fibers and at a strength at least sufficient to cause untangling of the fibers, dispersion of the fibers, orientation of the fibers, and close packing of the fibers in the desired orientation where substantially all of said fibers have their major axis substantially aligned, to form a continuous strand of filament, partially solidifying the liquid matrix surrounding the fibers to maintain a cohesive force between the fibers and partially solidified liquid matrix and thereby maintain the fibers in close packed alignment in the matrix surrounding said fibers and continually removing the continuous strand of filament from the unsolidified liquid matrix.

11. A system for producing a continuous strand of filaments, said system comprising a reactor vessel, means for introducing discrete fibers having an aspect ratio of at least 5.0 into a nonconductive liquid matrix and where the fibers have a dielectric constant at least 1.5 times greater than the dielectric constant of the liquid matrix, said filaments being selected from the class consisting of fibers of silica, silica sol, fume silica, silica gel, glass fibers, cristobalite, wollastonite, spodumene, mica, mullite, sillimanite, chrysoltile, crocidolite, forsterite, hercynite, kaolinite, dickite, nacrite, beidellite, bentonite, hectorite, montmorillonite, nontronite, saponite, attapulgite, iron, cobalt, nickel, aluminum, tin, lead, magnesium, calcium, strontium, barium, titanium, zirconium, vanadium, chromium, manganese, copper, zinc, the corresponding oxides of the above said metals, and heavy metal phosphates, sulfides, and sulfates, said matrix being selected from the class consisting of polyesters, polyimides, phenol-formaldehydes, epoxies, vinyl polymers and copolymers, polycarbonates, polyolefins, polyvinyl chloride, and polyurethanes, means associated with said reactor vessel for applying an electric field through said matrix under conditions giving rise to electrokinetic effects which are primarily dominated by electrophoretic effects enabling movement of the fibers with respect to the liquid matrix and electro-osmotic effects enabling movement of the liquid matrix with respect to the fiber, said field being of such magnitude so that the electrokinetic effects dominate other forces acting on individual fibers and at a strength at least sufficient to cause proper orientation and close packing of the fibers in the liquid matrix to form a continuous strand of filaments, partially solidifying the liquid matrix surrounding the fibers to maintain a cohesive force between the fibers and partially solidified liquid matrix and thereby maintain the fibers in close packed alignment in the matrix surrounding said fibers and means for removing said strand of filaments from the unsolidified liquid matrix as it is formed.

* * * * *

PO-1050
(5/69)

UNITED STATES PATENT OFFICE
CERTIFICATE OF CORRECTION

Patent No. 3,626,041    Dated December 7, 1971

Inventor(s) Joseph E. Fields and Edward H. Mottus

It is certified that error appears in the above-identified patent and that said Letters Patent are hereby corrected as shown below:

IN THE SPECIFICATION:

Column 1, line 5, "to sn apparatus and" should read --- to an apparatus and --- .
   See specification page 1, line 3.

Column 2, line 23, "moveable" should read --- movable --- .
   See specification page 3, line 27.

Column 2, line 36, "rodlike particulate molter" should read --- rodlike particulate matter --- .
   See specification page 4, line 9.

Column 2, line 70, "without degradation heat and pressure," should read --- without degradation under heat and presure, --- .
   See specification page 5, line 11.

Column 3, line 21, "present invention." should read --- present invention, ---.
   See specification page 6, line 8.

Column 4, line 25, "with this disclose" should read --- with this disclosure ---
   See specification page 8, line 21.

Column 4, line 49, "chrysolite" should read --- chrysotile --- .
   See specification page 9, line 12.

Column 4, line 75, "quantity of unorienta-" should read --- quantity of an unorienta- ---.
   See specification page 10, line 7.

Column 5, line 7, "composite, the prepolymer, or" should read -- composite, the prepolymer or --.
   See specification page 10, line 14.

UNITED STATES PATENT OFFICE
CERTIFICATE OF CORRECTION

PO-1050 (5/69)

Patent No. 3,626,041            Dated December 7, 1971

Inventor(s) Joseph E. Fields and Edward H. Mottus

It is certified that error appears in the above-identified patent and that said Letters Patent are hereby corrected as shown below:

Column 8, line 10, "tetraethylenetetramine" should read
--- tetraethylenetetraamine --- .
See specification page 17, line 4.

Column 8, line 19, "primarily suspension passes" should read
--- the suspension passes --- .
See specification page 17, line 12.

Column 8, line 20, "an electro-osmotic rate" should read
--- an input rate --- .
See specification page 17, line 14.

IN THE CLAIMS:

Claim 1 (Column 8), line 44, "electro-osmotic" should read
-- electroosmatic --.
See Claim 8 (Amendment C), line 10.

Claim 8 (Column 9), line 45, "5.0 into a [a] an" should read
--- 5.0 into [a] an --- .
See Claim 15 (Amendment C), line 3.

Claim 8 (Column 9), line 51, "chrysolite" should read --- chrysotile --- .
See Claim 15 (Amendment C), line 9.

Claim 10 (Column 10), line 13, "chrysolite" should read --- chrysotile --- .
See Claim 17 (Amendment C), line 9.

Signed and sealed this 15th day of May 1973.

(SEAL)
Attest:

EDWARD M. FLETCHER, JR.
Attesting Officer

ROBERT GOTTSCHALK
Commissioner of Patents